FM SONAR EXCITER

Filed March 22, 1966 2 Sheets-Sheet 1

INVENTORS
FRANCIS J. MURPHREE
JAMES H. HAMMOND, JR.
BY
Rolla N. Carter
Don D. Doty
ATTORNEYS

FM SONAR EXCITER

Filed March 22, 1966 2 Sheets-Sheet 2

INVENTORS
FRANCIS J. MURPHREE
JAMES H. HAMMOND, JR.
BY
ATTORNEYS

United States Patent Office 3,353,148
Patented Nov. 14, 1967

3,353,148
FM SONAR EXCITER

Francis J. Murphree, Sunnyside, and James H. Hammond, Jr., Panama City, Fla., assignors to the United States of America as represented by the Secretary of the Navy Filed Mar. 22, 1966, Ser. No. 538,164
10 Claims. (Cl. 340—3)

The invention described herein may be manufactured and used by or for the Government of the United States of America for governmental purposes without the payment of any royalties thereon or therefor.

The present invention relates in general to echo-search-ranging systems and in particular is a frequency modulation exciter circuit for a sonar system. In even greater particularity, it is an exciter for generating a linearily-varying frequency modulated carrier signal that may advantageously be employed in FM sonar systems as a timing and excitation means therefor.

In the past, thyratrons, vacuum tubes, and certain transistors have been employed, as appropriate, to generate sawtooth waveform signals. However, although suitable for many practical purposes, these prior art devices, when combined with their respective coacting circuitry ordinarily produce substantially linear sawtooth signals and, thus, have no means for practical manual regulation thereof. Therefore, they may not be used to compensate or correct for non-linearities or other irregularities that are usually inherent in associated astable multivibrator circuits and the like. Also, in the past, there has apparently been no satisfactory provision incorporated in the prior art FM sonar exciters to delete the objectionable noise signals which ordinarily occur within the circuitry thereof (and, hence, in the output signal therefrom) each time the sawtooth generator is reset for timely beginning a new sawtooth cycle. Accordingly, the fidelity of such exciters and the output signals therefrom are not as good as could be and, therefore, leave something to be desired.

In addition, in most instances, the prior art FM exciter systems have been bulky and unwieldy, quite heavy in weight, and require relatively high-power power supplies.

The instant invention overcomes most of the difficulties encountered in the devices of the prior art, in that astable multivibrator or other oscillator non-linearities and/or irregularities are substantially compensated for and reset functions are effectively blanked out, thereby improving considerably the linearity of the rate-of-frequency-change of the exciter output signal for each sweep cycle thereof, and, thus, the output of any sonar system which incorporates it, as well.

It is, therefore, an object of this invention to provide an improved exciter for echo-search and echo-ranging systems such as, for example, sonar, radar, and the like.

Another object of this invention is to provide a sonar exciter having a linearly-varied frequency modulation output signal.

Still another object of this invention is to provide a frequency modulation sonar exciter that produces an output having improved frequency stability and accuracy.

A further object of this invention is to provide an FM sonar exciter which is capable of being manually regulated, so as to compensate the voltage ramp output thereof for nonlinearities occurring in associated and coacting circuitry.

Another object of this invention is to provide an improved method and means for generating a linearity-varying transmission frequency.

A further object of this invention is to provide a sawtooth signal generator having a sawtooth voltage output which may be regulated in such manner as to be linear or as non-linear as desired.

Still another object of this invention is to provide an improved sonar exciter which has objectionable reset signal noises substantially eliminated therefrom.

Still another object of this invention is to provide a sonar exciter having improved continuous range finding characteristics.

Another object of this invention is to provide a sonar system having improved target identification capabilities.

Another object of this invention is to provide a method and means of generating a frequency modulated signal having a substantially linear rate of change of frequency within predetermined lower and upper frequency limits.

Another object of this invention is to provide an improved FM sonar exciter which is easily and economically manufactured, operated and maintained, and which is readily adapted for incorporation in echo-ranging systems, such as sonar systems, radar systems, and the like.

Other objects and many of the attendant advantages will be readily appreciated as the subject invention becomes better understood by reference to the following detailed description when considered in conjunction with the accompanying drawing wherein.

Figure 1:
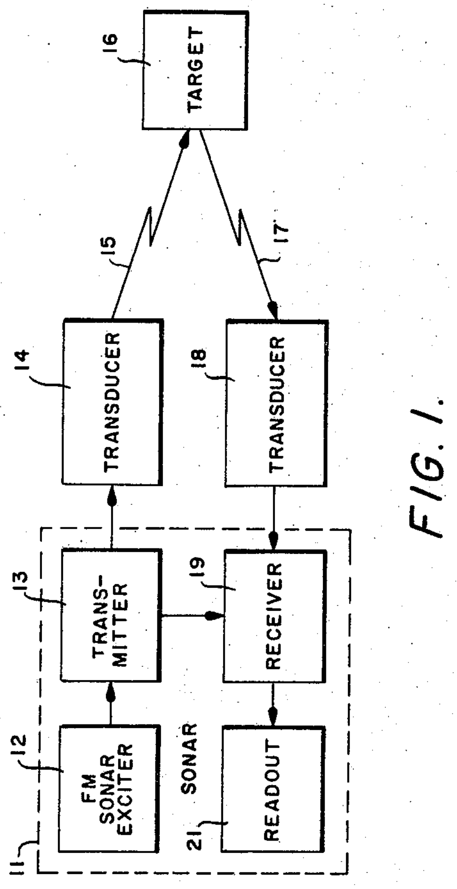
FIG. 1 is a functional block diagram of a typical sonar system in which the FM sonar exciter constituting this invention may be incorporated to an advantage.

Referring now to FIG. 1, there is shown a representative sonar system 11 which incorporates the FM sonar exciter 12 constituting this invention. The output of exciter 12 is coupled to the input of a sonar transmitter 13, the output of which is, in turn, coupled to the input of an electroacoustical transmitting transducer 14.

Since the preferred embodiment of this invention is used in conjunction with a sonar system for disclosure simplicity purposes, transducer 14 is an electroacoustical transducer adapted for broadcasting sonic energy 15 throuughout a predetermined volume of a subaqueous medium. Once said broadcast sonic energy acquires a target 16, it is reflected as an echo-signal 17 therefrom to a receiving transducer 18, which is, likewise, of the electroacoustical type, and which is, thus, adapted for receiving sonic energy within said subaqueous medium. The output of transducer 18 is coupled to the input of a sonar receiver 19, the operation of which is correlated with the aforesaid transmitter 13, as a result of being interconnected therewith. The output of sonar receiver 19 is coupled to any appropriate readout 21, such as, for example, a recorder a cathode ray display system, or the like.

Figure 2:
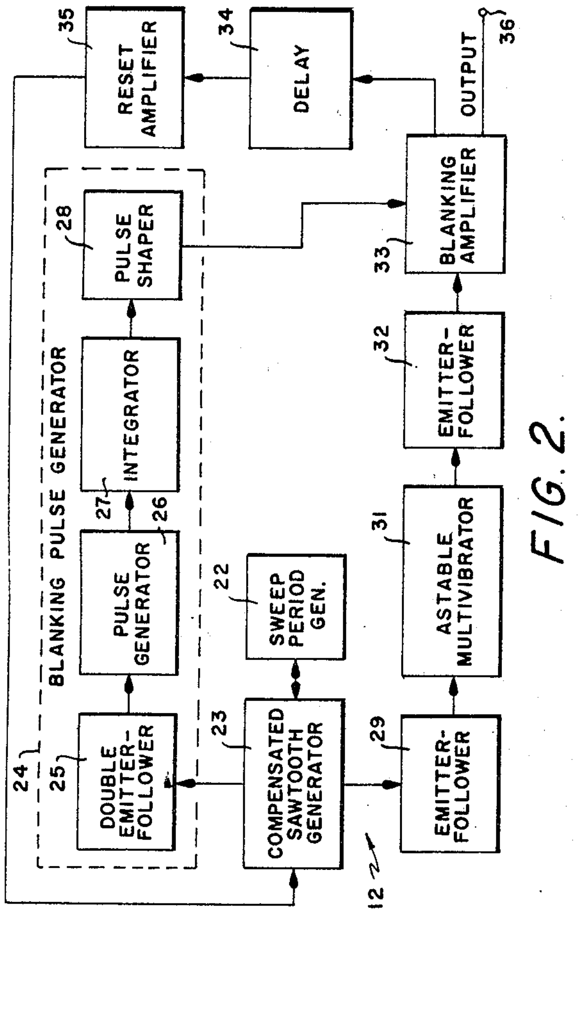
FIG. 2 is a functional block diagram of a preferred embodiment of the FM sonar exciter constituting this invention.

FM sonar exciter 12 is further shown in FIG. 2 as having a sweep period selector 22 which is interconnected to a compensated sawtooth generator 23 for selectively regulating the cyclical sawtooth frequency thereof. Compensated sawtooth generator 23 has a pair of outputs, one of which is connected to the input of a blanking pulse generator 24. In practice, said compensated sawtooth generator 23 is actually coupled to the input of a double emitter-follower 25, and the output thereof is connected to the input of a pulse generator 26. The output of pulse generator 26, is, in turn, coupled to the input of an integrator 27, with the output thereof coupled to the input of a pulse shaper 28. Of course, as may readily be seen from FIG. 2, double emitter-follower 25, pulse generator 26, integrator 27, and pulse shaper 28 are so combined as to constitute the aforementioned blanking pulse generator 24.

The other output of compensated sawtooth generator 23 is coupled to the input of an emitter-follower 29, with the output thereof connected to the input of an oscillator, or the like, such as astable multivibrator 31. The output of astable multivibrator 31 is coupled through a circuit isolation emitter-follower 32 to one of the inputs of a blanking amplifier 33. The other input of said blanking amplifier 33 is coupled to the output of aforesaid pulse shaper 28 in order to timely receive a blanking pulse signal therefrom. Blanking amplifier 33 has a pair of outputs, one of which is coupled to the input of a delay circuit 34, which, in turn, has its output coupled through a reset amplifier 35 to the reset input of the aforesaid compensated sawtooth generator 23. The other output of blanking amplifier 33 is connected to a suitable output terminal 36 which, in this particular case, constitutes the output of FM sonar exciter 12, the subject invention.

Figure 3:
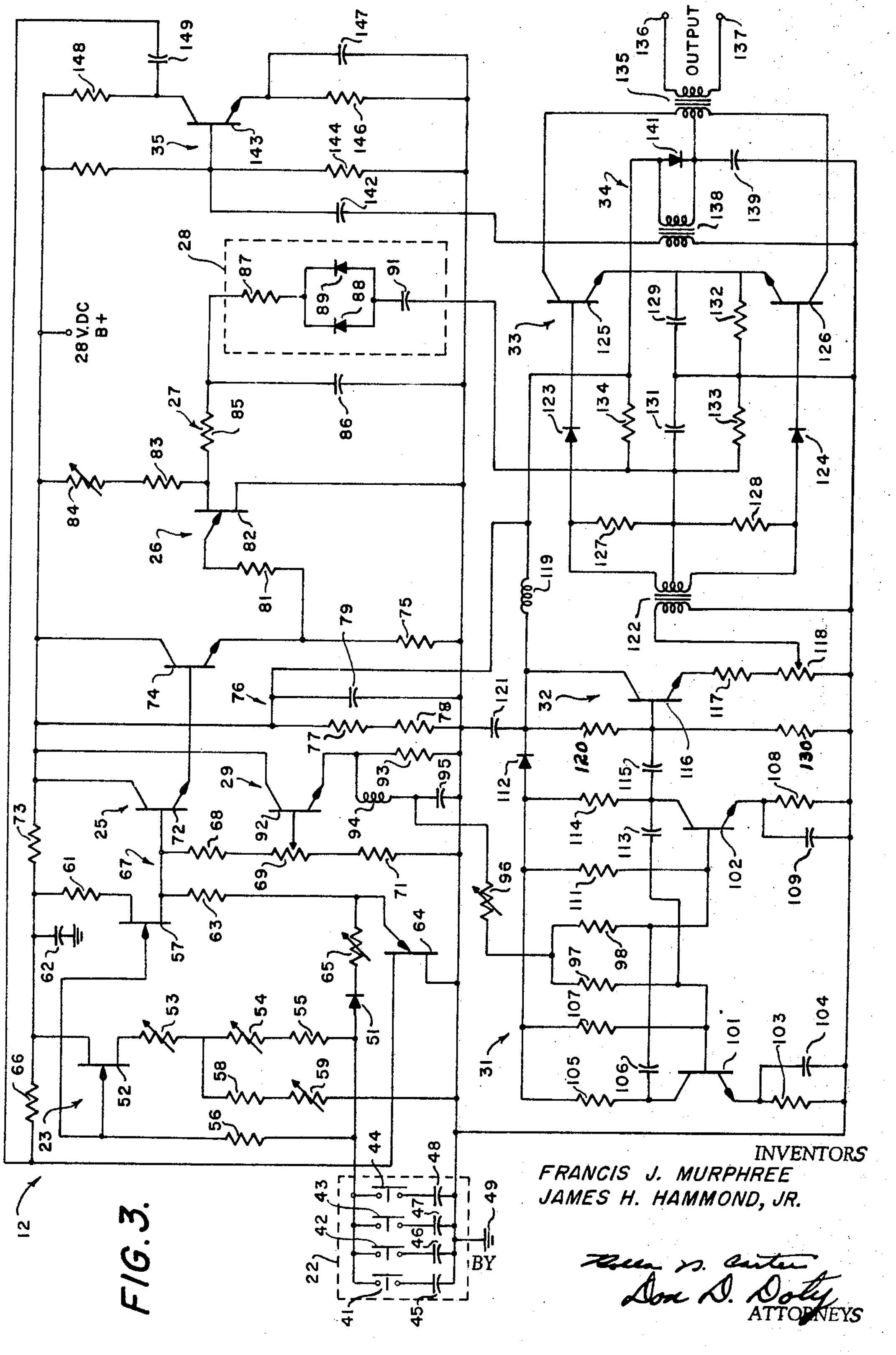
FIG. 3 is a detailed schematic circuit diagram of the subject invention disclosed in block diagram form in FIG. 2.

FIG. 3, the detailed schematic diagram of the subject invention, discloses sweep period selector 22 as including a plurality of selector switches 41 through 44 respectively connected in series with one of the plates of a like plurality of capacitors 45 through 48. The other plate of each of said plurality of capacitors is interconnected with the others and to a ground 49. Those contacts of the aforesaid switches which are not respectively connected to said capacitors are interconnected and connected to the input of compensated sawtooth generator 23 at the anode of a diode 51 contained therein. Said capacitors 45 through 48 are extremely low-leakage polystyrene capacitors to minimize uncontrolled nonlinearities.

Compensated sawtooth generator 23 includes a field effect transistor 52 having the drain thereof connected to a first positive B+ voltage and the source thereof coupled through a pair of series connected variable resistors 53 and 54 which are series connected through a fixed resistor 55 to the aforesaid anode of diode 51. The gate of field effect transistor 52 is connected through a fixed resistor 56 to the anode of diode 51. It is also connected directly to the gate of another field effect transistor 57. The junction of variable resistors 53 and 54 is coupled through a resistor 58 that is series connected with a variable resistor 59 which, in turn, is connected to the aforesaid ground. The drain of field effect transistor 57 is coupled through a fixed resistor 61 to the aforesaid first B+ voltage. Incidentally, said first B+ voltage is preferably stabilized and decoupled by a capacitor 62 connected between it and ground.

The output from field effect transistor 57 is taken from the source thereof and coupled through a fixed resistor 63 to the emitter of a unijunction transistor 64. It is also connected through a variable resistor 65 to the cathode of the aforesaid diode 51. The first base of unijunction transistor 64 is directly connected to ground, and the second base thereof is connected through a fixed resistor 66 to the aforesaid first B+ voltage. The base of field effect transistor 57 to which resistor 63 is connected is also connected to a voltage divider network 67 to ground. In this particular instance, voltage divider network 67 is composed of a first resistor 68 connected in series with the resistance portion of a potentiometer 69 which, in turn, is series connected with another fixed resistor 71 that is connected to ground. In addition, the source of transistor 57 connected to resistors 63 and 68 is also connected to the base of a transistor 72. The collector of transistor 72 is connected to a second B+ voltage, which is preferably of the order of 28 direct current volts. A voltage dropping resistor 73 interconnects said 28 volt DC with the aforementioned first B+ voltage, thereby reducing the first B+ voltage slightly.

The emitter of NPN transistor 72 is directly coupled to the base of another NPN transistor 74, and the collector thereof is connected directly to said 28 volt B+ voltage. The emitter of transistor 74 is connected through a fixed resistor 75 to ground. A B+ voltage stabilization network 76, consisting of a pair of series connected resistors 77 and 78 with a capacitor 79 connected in parallel therewith is connected between the aforesaid 28 volt B+ voltage and ground.

The emitter of transistor 74 is coupled through a fixed coupling resistor 81 to the emitter of a unijunction transistor 82. The first base of transistor 82 is connected through a fixed resistor 83 and a variable resistor 84, connected in series therewith, to said 28 volt B+ voltage, and the second base thereof is directly connected to ground. The first base of unijunction transistor 82 is coupled through a fixed resistor 85 and a capacitor 86, connected in series therewith, to ground. Since the combination of resistor 85 and capacitor 86 constitutes the aforementioned integrator 27, the output therefrom is taken at the junction thereof and is applied to the input of pulse shaper 28. In this particular case, pulse shaper 28 includes resistor 87 which, in turn, is connected to a pair of oppositely polarized parallel connected diodes 88 and 89, which is then connected to one plate of a capacitor 91. The other plate of capacitor 91 constitutes the output of pulse shaper 28 and, hence, the output of blanking pulse generator 28. Since this output is the blanking pulse signal, it will be discussed more fully below in the discussion of the operation of the subject invention.

The movable arm of the aforesaid potentiometer 69, located in voltage divider network 67, constitutes the second output from compensated sawtooth generator 33. It is connected to the base of an NPN transistor 92 located within the circuit of emitter-follower 29. The collector of transistor 92 is directly coupled to said 28 volt B+ voltage, and the emitter thereof is connected through a fixed resistor 93 to ground. The emitter thereof is also connected through a series connected inductance 94 and capacitor 95 to said ground. The junction of series connected inductance 94 and capacitor 95 is coupled through a variable resistor 96 to the input of astable multivibrator 31. In this particular design, the input of astable multivibrator 31 consists of the junction of a pair of fixed resistors 97 and 98, the other terminals of which are respectively applied to the bases of a pair of NPN transistors 101 and 102.

The emitter of transistor 101 is connected through a fixed resistor 103 to ground with a bypass capacitor 104 parallel connected with resistor 103. The collector of transistor 101 is connected through a fixed resistor 105 to said 28 volt B+ voltage, and, also, the collector thereof is connected through a coupling capacitor 106 to the base of the aforesaid transistor 102. The base of transistor 101 is biased by a fixed resistor 107 which is also connected to the aforesaid 28 volt B+ voltage. Transistor 102 has the emitter thereof connected through a fixed resistor 108 to ground with a bypass capacitor 102 connected in parallel with said fixed resistor 108. The base of transistor 102 is coupled through a fixed biasing resistor 111 to said 28 volt B+ voltage and to the anode of a diode 112. The collector of transistor 102 is coupled through a capacitor 113 to the base of the aforesaid transistor 101, and is also connected through a fixed resistor 114 to said 28 volt B+ voltage and the anode of said diode 112.

The output from astable multivibrator 31 is taken from the collector of transistor 102 and is applied through a coupling capacitor 115 to the base of an NPN transistor 116 located in the aforementioned cathode follower circuit 102. The emitter thereof is coupled through a fixed resistor 117 and the resistance portion of a potentiometer 118, connected in series therewith, to ground. The collector thereof is directly connected to the aforesaid 28 volt B+ voltage and one terminal of a filter inductance 119. For voltage stabilization purposes, one plate of a capacitor 121 is connected to said 28 volt B+ voltage at the junction of the cathode of said diode 112 and said one terminal of inductance 119, with the other plate thereof connected to ground.

The output from emitter-follower 32 is taken from the movable arm of potentiometer 118, and it is coupled through the primary winding of a transformer 122 to ground. The secondary winding of said transformer 122 constitutes the input of the aforesaid blanking amplifier 33. As may readily be seen from the circuitry disclosed in FIG. 3, blanking amplifier 33 is of the push-pull variety. The terminals of the secondary winding of transformer 122 are respectively coupled through a pair of diodes 123 and 125 to the bases of a pair of NPN transistors 125 and 126. Also, said secondary winding terminals are respectively connected to a center tap thereof through a pair of fixed resistors 127 and 128, respectively. The aforesaid transistors 125 and 126 have their emitters interconnected and coupled to ground through capacitor 129. The aforesaid center tap of the secondary winding of transformer 122 is coupled to ground through capacitor 131. The common junction of the aforesaid capacitors 129 and 131 is directly connected to ground, and a pair of resistors 132 and 133 are parallel connected with capacitors 129 and 131, respectively. The common junction of capacitor 131 and the center tap of the secondary winding of transformer 122 is coupled through a fixed resistor 134 to the aforesaid 28 volt B+ voltage and the other terminal of said inductance 119.

In this particular embodiment, the center tap of the secondary winding of transformer 122 also constitutes the blanking pulse input to blanking amplifier 33; hence, it is connected to the output of pulse shaper 28 for receiving the blanking pulse signal therefrom.

The outputs of blanking amplifier 33 are taken from the collectors of transistors 125 and 126 and they are respectively applied to the terminals of the primary winding of an output transformer 135. Of course, in this particular instance, the outputs of the subject invention are taken from the secondary winding of output transformer 135, and they are connected to output terminals 136 and 137 for this purpose, respectively.

The center tap of the primary winding of output transformer 135 is connected to one terminal of the primary winding of another transformer 138. Also, it is connected through a capacitor 139 to ground. The other terminal of the primary winding of transformer 138 is directly connected to the aforesaid 28 volt B+ voltage. A diode 141 is connected in parallel with the primary winding of transformer 138. The secondary winding of transformer 138 has one terminal thereof connected directly to ground and the other terminal thereof connected through a coupling capacitor 142 to the input of reset amplifier 35. In this particular instance, transformer 138, capacitor 139, and diode 141 interact in such manner as to provide the aforementioned delay 34.

The input of reset amplifier 35 is actually at the base of a transistor 143, which is biased by a fixed resistor 144 connected to ground and a resistor 145 connected to said 28 volt B+ voltage. The emitter thereof is connected through a fixed resistor 146 to ground, and a bypass capacitor 147 is connected in parallel with said resistor 146. The collector thereof is coupled through a fixed resistor 148 to said 28 volt B+ voltage.

The output from reset amplifier 35 is taken from the collector of transistor 143 and is coupled through a coupling capacitor 149 to the ungrounded second base of the aforementioned unijunction transistor 64 located in compensated sawtooth generator 23. This latter connection, of course, is that which enables the reset pulse to be supplied to compensated sawtooth generator 23 for initiating each new sawtooth cycle thereof.

The operation of the subject invention will now be discussed briefly in conjunction with all figures of the drawing.

An FM sonar, in contrast to a pulse type sonar, transmits energy continuously. Range to a target is determined by the difference frequency produced by heterodyning the target echo frequency with the transmitted frequency. Since the frequency of the transmitted signal is continuously changing at preferably a linear rate between lower and upper frequency limits, there is almost continuous range information available at the output of the sonar system.

The FM exciter constituting this invention comprises one of the most complex and more important components of an FM sonar. Its function is to generate a substantially linearly-varying transmission frequency that forms the basis therefor and in this particular case, it is unique, in that field effect transistors are combined with associated elements in the sawtooth voltage generator circuit in such a manner as to obtain a ramp voltage that may be adjusted to reduce the control voltage-frequency nonlinearity of the oscillatory astable multivibrator, and thereby control the frequency modulated output thereof to an advantage.

As may readily be seen from FIGS. 2 and 3, the output of sawtooth generator 23 frequency modulates astable multivibrator 31. This occurs because, at the beginning of the sawtooth cycle, that capacitor of sweep period selector 22 which is operatively switched into the circuit is charged with a constant current from field effect transistor 52, and this constant current is maintained by bootstrapping the emitter of transistor 52 to the base thereof through charging resistors 53, 54, and 55 and bias resistor 56. The rate of charge of the sweep period generator capacitor causes the voltage across it to increase in a proportional ramp-like manner. Because the gate of field effect transistor 57 is, likewise, connected to the gate of transistor 52, it, too, responds in a similar fashion and applies a similar ramp voltage to the emitter of unijunction transistor 64. When that ramp voltage reaches a preset level, transistor 64 conducts, thus causing the emitter resistance thereof to drop from a very high value to a very low value and the sweep period generator capacitor to discharge through diode 51.

After the sweep period generator capacitor has discharged, unijunction transistor 64 stops conducting and the cycle begins all over again. Because this process continually repeats itself, a sawtooth waveform of the order of that shown in FIG. 4(*a*) is generated. As previously mentioned, FIG. 4(*a*) is an idealized graphical representation; however, an inspection thereof will disclose that the sawtooth ramps are not linear but, instead, are somewhat exponentially curved.

In the subject invention, sawtooth generator 23 is not allowed to free-run. Instead, it is timely reset by applying a negative pulse, such as that exemplarily depicted in FIG. 4(*e*), to the second base of unijunction transistor 64, before the emitter potential thereof rises to the point where it would reset the sawtooth generator by itself.

In this particular preferred embodiment, the output waveform of the sawtooth generator has four possible sweep periods. The periods are chosen manually by closing any one of the switches 41 through 44 which, of course, puts its series connected capacitor in the sawtooth circuit for charging and discharging at the proper times. Preferably, sweep period selector 22 should be so designed that only one of switches 41 through 44 can be closed at any one time.

The setting of variable resistor 65 establishes the initial voltage on the emitter of transistor 57 at the time diode 51 is conducting at the start of the sawtooth cycle, and, therefore, this setting controls, among other things, the lower voltage limit where the sawtooth begins its sweep.

As previously suggested, the ramp portion of the sawtooth output signal from compensated sawtooth generator 23 is not linear and is intentionally made so in this invention, in order that it may be explicitly varied in curvature as necessary to compensate for any variance in linearity that may exist in associated circuitry such as, for example, astable multivibrator 31 herein disclosed.

To effect said controllable nonlinear ramps, variable resistance 53 is inserted in the source circuit of field effect transistor 52 along with fixed resistor 58 and variable resistor 59 connected in series therewith.

Regardless of the degree of linearity that may be occurring in the output of compensated sawtooth generator 23 as a result of manual adjustment of resistor 53, the output thereof is applied to and used in the associated circuits of blanking pulse generator 24 and, through emitter-follower 29, astable multivibrator 31. Emitter-follower 29 is, of course, inserted between sawtooth generator 23 and astable multivibrator 31 in order to provide circuit isolation therebetween. Without such circuit isolation, the input signal to astable multivibrator 31 would be of such quality as to disturb the oscillatory aspect thereof, especially with respect to the proper and timely varying of the frequency thereof.

As may readily be seen from FIG. 3, astable multivibrator 31 includes two NPN transistors which are cross-coupled and which generate that frequency which will ultimately be the frequency of the output signal from the subject invention. In effect, the voltage from the sawtooth generator is taken from the movable arm of potentiometer 69 of network 67, and after passing through emitter-follower 29 is effectively applied to the bases of transistors 101 and 102. The output frequency of this multivibrator accordingly increases as the sawtooth voltage increases.

Potentiometer 69 of the sawtooth generator controls the amplitude of the signal supplied to astable multivibrator 31, as well as its average DC voltage level. It, therefore, serves to increase the limits of the sweep frequency and, also, serves to simultaneously shift the multivibrator center frequency as well. Variable resistor 96, inserted between the output of emitter-follower 29 and the input of astable multivibrator 31, is incorporated in this invention so as to enable the center frequency and the sweep limits of the multivibrator to be changed without changing its sweep period, and it accomplishes this due to the fact that it is located on the multivibrator side of emitter follower 29. In all other respects, astable multivibrator 31 operates in a conventional manner in conjunction with sawtooth generator 23 to produce a substantially linear rate of change of frequency of the output signal therefrom. This is essentially true in this particular case because those known nonlinearities which inherently occur therein are compensated for by the substantially equal and opposite non-linearities intentionally designed into the aforesaid compensated sawtooth generator 23.

The output from astable multivibrator 31 is taken from the collector of transistor 102, and after being processed by circuit isolation emitter follower 32, is applied to the input of blanking amplifier 33, said input being, in this particular instance, the primary winding of input transformer 122. As may readily be seen from FIG. 3, blanking amplifier 33 is of the push-pull type, where the secondary winding of input transformer 122 is coupled through diodes 123 and 124 before being applied to the bases of power amplifying transistors 125 and 126. The outputs from said power amplifying transistors are then conventionally applied to the primary winding of an output transformer 135, the secondary winding of which constitutes the output of the entire invention.

Referring again to blanking pulse generator 24, it may be seen that the second output from compensated sawtooth generator 23 is further processed therewithin, in order to timely produce a blanking signal which will ultimately be applied to the aforesaid blanking amplifier 33. In this particular instance, said second output from compensated sawtooth generator 23 is taken from the second base of field effect transistor 57 and is coupled through the series connected transistors 72 and 74 incorporated in double emitter-follower 25. Again, due to the necessity of preventing spurious signals from being transferred from sawtooth generator 23 to blanking amplifier 33 via the blanking pulse, a high efficient circuit-isolation circuit is incorporated therebetween and this circuit is, of course, the cascaded transistors 72 and 74 of double emitter-follower 25.

Figure 4:
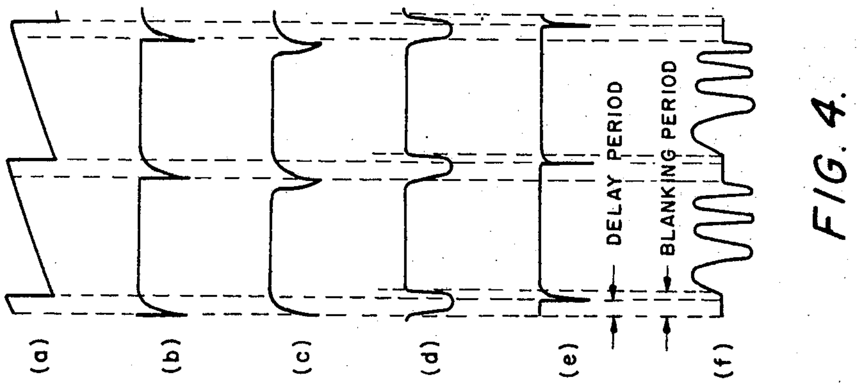
FIG. 4 is an idealized graphical representation of signal waveforms which respectively emanate from the various components of the devices of FIGS. 2 and 3.

The output of double emitter-follower 25 is taken from the emitter of transistor 74 and applied to the input of pulse generator 26 which, in turn, produces an output signal having pulses substantially as shown in the waveform of FIG. 4(*b*). As may readily be seen, these pulses constitute the outputs from unijunction transistor 82, and after being applied to integrator 27, they take on the general characteristics of the waveform shown in FIG. 4(*c*). Potentiometer 84 should be so chosen and adjusted that transistor 82 will conduct and thereby generate a pulse at a potential which is slightly lower than that which causes unijunction transistor 64 to conduct. This, of course, places the pulses of FIG. 4(*b*) slightly ahead in time of the discharging of the operative frequency selector capacitor. Accordingly, inspection of FIGS. 4(*b*) and (*c*) will disclose that the negative pips thereof occur slightly before the occurrence of the following edge of the sawtooth waveform depicted in FIG. 4(*a*). Incidentally, potentiometer 84 determines the upper voltage limit to which the sawtooth voltage will sweep before the reset cycle is initiated by the conductance of transistor 82 in pulse generator circuit 26.

After being integrated in integrator 27 and shaped in pulse shaper 28, the blanking pulse is applied to the center tap of the secondary winding of input transformer 122. Because it is negative in character, at the time of its occurrence, it effectively cuts off power amplifier transistors 125 and 126, thereby cutting off the entire blanking amplifier 33 for that period of time. Inspection of FIG. 4(*d*) will disclose a representative waveform of the blanking pulse output from shaper 28, and from it, it may be readily discerned that a predetermined blanking period is effected thereby.

As a result of the collector currents from blanking amplifier transistors 125 and 126 being cut off by the blanking pulse, the circuit incorporating transformer 138, diode 141 and capacitor 139 begins to ring. Diode 141, shunted across the primary winding of transformer 138, dampens the first positive half-cycle occurring therein, and thus, causes a delayed positive pulse to be generated in the secondary winding of transformer 138 when the first negative half cycle passes through the primary winding thereof. The resulting positive pulse, which is consequently generated by the secondary winding of transformer 138, ultimately becomes the reset pulse. This positive reset pulse is then coupled to the base of transistor 143 for polarity inversion and further amplification to a more useful voltage level, after which it is coupled through coupling capacitor 147 as the reset pulse which is applied to the ungrounded base $B_2$ of unijunction transistor 64 of compensated sawtooth generator circuit 23. This reset pulse takes on the waveform characteristics similar to those shown in FIG. 4(*e*), and due to the aforementioned delay effected by transformer 138 and associated circuitry, the negative reset pulses may be seen to fall within that period of time which occurs during the blanking of blanking amplifier 33. Hence, for all practical purposes, reset of the compensated sawtooth generator occurs while blanking amplifier 33 is turned off by the blanking pulse of FIG. 4(*d*), so as to prevent output signals from occurring thereat during the occurrence of the aforesaid reset operation. In other words, the logic of the blanking circuit is such that it will insure that the exciter output is completely cut off before the reset pulse is generated and, thus, before the sawtooth voltage generator is reset thereby. And this is accomplished by as a result of the delay which occurs due to utilizing the second half cycle of the dampened sinusoidal signal generated by the primary winding of the pulse transformer LC network constituting delay circuit 34 incorporated in the output stage of blanketing amplifier 33. Hence, the output circuit (that is, the output of blanking amplifier 33) is always blanked for a finite period of time before, during, and after compensated sawtooth generator 23 is reset by the reset signal output from reset amplifier 35.

After reset occurs and the blanking pulse has been removed from amplifier 33, an output signal emanates therefrom which has substantially sinusoidal waveform characteristics similar to those exemplarily shown in FIG. 4(*f*). In actual practice, the waveform of the output signal of this invention may be characterized as necessary to meet any predetermined operational requirements. Hence, it should be understood that suitable filters, etc., may be incorporated in or combined with the subject invention to effect such results, if so desired. Obviously, so doing would not violate the scope and spirit of this invention, because it would be well within the purview of one skilled in the art having the benefit of the teachings herewith presented. Accordingly, although the somewhat limited frequency responses of the various and sundry components of the blanking amplifier of this invention concertedly operate to convert the substantially rectangular output signal of the astable multivibrator to a signal having a substantially sinusoidal waveform, other waveforms may also be produced, too. However, to keep this disclosure as simple as possible, the waveform of the output of the subject invention will be considered as being sinusoidal or substantially sinusoidal, in view of the fact that it is the frequency characteristics thereof that are being controlled by the invention, rather than the waveforms thereof. As may be seen from said FIG. 4(*f*), the frequency of the output signal increases at a uniform rate during its operative time period and, therefore, the objective of this invention is fulfilled.

Obviously, many modifications and other embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A frequency modulation signal generator comprising in combination:

means for generating a sawtooth signal having an adjustable nonlinear ramp voltage and a rapidly decaying following edge voltage;

means effectively connected to the output of said sawtooth signal generating means for producing a substantially sinusoidal output signal having a frequency that is substantially linearly modulated in response to said nonlinear ramp voltage;

means connected to the outputs of said sawtooth signal generating means and said substantially sinusoidal output signal producing means for blanking said substantially sinusoidal signal for a period of time which encompasses the occurrence of the aforesaid decaying following edge voltage; and means connected between an output of said substantially sinusoidal signal producing means and an input of the aforesaid sawtooth signal generating means for resetting said sawtooth signal generating means at a predetermined time within the time period said substantially sinusoidal signal is blanked.

2. The device of claim 1 wherein said means for generating a sawtooth signal having an adjustable nonlinear ramp voltage and a rapidly decaying following edge voltage comprises:

a B+ voltage;

a first field effect transistor having a drain, a source, and a gate, with the drain thereof connected to said B+ voltage;

a diode having an anode and a cathode;

a first resistance means connected between the gate of said first field effect transistor and the anode of said diode;

a first and second variable resistance means commonly joined in series and connected between the source of said first field effect transistor and the anode of said diode;

a ground;

a third variable resistance means connected between the common junction of said first and second variable resistance means and said ground;

a second field effect transistor having a gate connected to the gate of said first field effect transistor, a drain, and a source adapted for being the output of the subject nonlinear sawtooth signal generator;

a second resistance means connected between the drain of said second field effect transistor and said B+ voltage;

a unijunction transistor having an emitter, a first base, and a second base, with the first base thereof connected to said ground;

a third resistance means connected between the emitter of said unijunction transistor and the source of the aforesaid second field effect transistor;

a fourth variable resistance means connected between the emitter of said unijunction transistor and the cathode of the aforesaid diode;

a fourth resistance means connected between the second base of said unijunction transistor and said B+ voltage; and a variable capacitance means connected between the anode of said diode and said ground.

3. The device of claim 1 wherein said means effectively connected to the output of said sawtooth signal generating means for producing a substantially sinusoidal output signal having a frequency that is substantially linearly modulated in response to said non-linear ramp voltage comprises:

an astable multivibrator; and a blanking amplifier connected to the output of said astable multivibrator.

4. The device of claim 1 wherein said means connected to the output of said sawtooth signal generating means and said substantially sinusoidal output signal producing means for blanking said substantially sinusoidal signal for a predetermined period of time which encompasses the occurrence of the aforesaid decaying following edge voltage comprises a blanking pulse generator including:

a double emitter-follower connected to the output of said sawtooth signal generating means;

a pulse generator connected to the output of said double emitter-follower;

an integrator coupled to the output of said pulse generator; and a pulse shaper connected between the output of said integrator and the blanking input of the aforesaid sinusoidal output signal producing means.

5. The device of claim 1 wherein said means connected between an output of said sinusoidal signal producing means and an input of the aforesaid sawtooth signal generating means for resetting said sawtooth signal generating means at a predetermined time within the time period said sinusoidal signal is blanked comprises a delay means including:

a transformer having a primary winding with a pair of terminals and a secondary winding with a pair of terminals, with one of the terminals of the primary winding thereof connected in such manner to the output of said sinusoidal output signal producing means as to receive a pulse signal at substantially the same time the blanking of said sinusoidal output signal is initiated;

a diode having an anode and a cathode, with the cathode thereof connected to said one transformer primary winding terminal and the anode thereof connected to the other terminal of said transformer primary winding, thereby connecting said diode in parallel with said transformer primary winding;
a ground, with one of the terminals of the secondary winding of said transformer connected thereto;
a capacitor connected between the cathode of said diode and said ground; and
a reset amplifier having an input and an output, with the input thereof connected to the other terminal of the secondary winding of the transformer of said delay means and the output thereof connected to the reset input of the aforesaid sawtooth signal generating means.

6. The invention of claim 1 further characterized by means connected to said sawtooth signal generating means for selectively varying the cyclical frequency of the sawtooth signal produced thereby.

7. The invention according to claim 1 in combination with:
a transmitter having an input, a synchronization signal output, and a transmission signal output, with the input thereof connected to the output of said sinusoidal output signal producing means;
a transmitting transducer connected to the transmission signal output of said transmitter;
a receiving transducer for receiving the signal transmitted by said transmitting transducer after it has been reflected from a target;
a receiver having a pair of inputs and an output, with one of the inputs thereof coupled to the output of said receiving ttransducer, and the other input thereof connected to the synchronization signal output of the aforesaid transmitter; and
a readout means connected to the output of said receiver for displaying a signal representing the aforesaid received target reflected signal.

8. An FM sonar exciter comprising in combination:
a sawtooth signal generator having means included therein for varying the ramp voltage of the sawtooth signal produced thereby in a predetermined nonlinear manner;
time base generator means connected to said sawtooth signal generator for selectively regulating the cyclical frequency of the sawtooth signal produced thereby;
a double emitter-follower connected to the output of said sawtooth generator;
a pulse generator coupled to the output of said double emitter-follower;
an integrator coupled to the output of said pulse generator;
a pulse shaper connected to the output of said integrator;
a first emitter-follower connected to the output of said sawtooth generator;
an astable multivibrator connected to the output of said first emitter-follower;
a second emitter-follower coupled to the output of said astable multivibrator;
a blanking amplifier having a pair of inputs including a transmission signal input and a blanking signal input and a pair of outputs including a transmission output and a reset output, with the transmission signal input thereof coupled to the output of the aforesaid second emitter-follower, and with the blanking signal input thereof coupled to the output of the aforesaid pulse shaper for receiving a blanking signal having a predetermined blanking time period; and
a delay means effectively connected between the reset output of said blanking amplifier and a reset input of the aforesaid sawtooth generator for timely supplying a predetermined reset signal thereto within said blanking time period.

9. A nonlinear sawtooth signal generator comprising in combination:
a B+ voltage;
a first field effect transistor having a drain, a source, and a gate, with the drain thereof connected to said B+ voltage;
a diode having an anode and a cathode;
a first resistance means connected between the gate of said first field effect transistor and the anode of said diode;
a first and second variable resistance means commonly joined in series and connected between the source of said first field effect transistor and the anode of said diode;
a ground;
a third variable resistance means connected between the common junction of said first and second variable resistance means and said ground;
a second field effect transistor having a gate connected to the gate of said first field effect transistor, a drain, and a source adapted for being the output of the subject nonlinear sawtooth signal generator;
a second resistance means connected between the drain of said second field effect transistor and said B+ voltage;
a unijunction transistor having an emitter, a first base, and a second base, with the first base thereof connected to said ground;
a third resistance means connected between the emitter of said unijunction transistor and the source of the aforesaid second field effect transistor;
a fourth variable resistance means connected between the emitter of said unijunction transistor and the cathode of the aforesaid diode;
a fourth resistance means connected between the second base of said unijunction transistor and said B+ voltage; and
a variable capacitance means connected between the anode of said diode and said ground.

10. The invention according to claim 9 further characterized by a voltage divider network including a potentiometer connected between the source of said second field effect transistor and said ground, with the movable arm of said potentiometer adapted for being the output from the subject nonlinear sawtooth signal generator.

References Cited

UNITED STATES PATENTS

| | | | |
|---|---|---|---|
| 2,977,568 | 3/1961 | Roshon et al. | |
| 3,041,470 | 6/1962 | Woodworth | 307—88.5 |
| 3,114,114 | 12/1963 | Atherton. | |
| 3,188,637 | 6/1965 | Mortley | 343—14X |
| 3,201,718 | 8/1965 | Trojak. | |
| 3,260,991 | 7/1966 | Laakmann | 340—1 X |

RODNEY D. BENNETT, *Primary Examiner.*

R. A. FARLEY, *Assistant Examiner.*